Nov. 23, 1965     J. R. COLE     3,219,971
METHOD AND APPARATUS FOR MAINTAINING PHASE RELATION
Filed Nov. 15, 1962     4 Sheets-Sheet 2

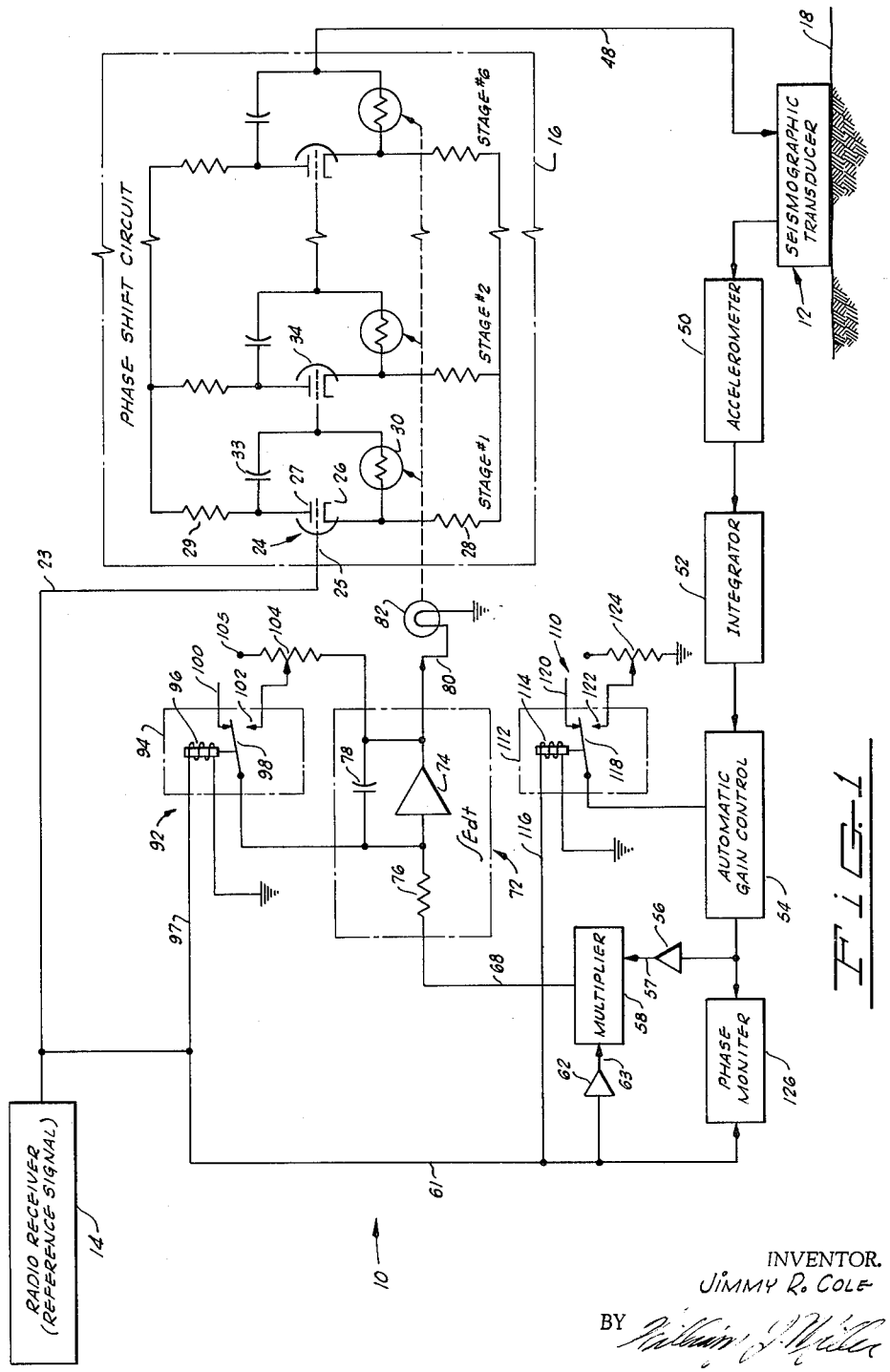

INVENTOR.
JIMMY R. COLE
BY *William V. Miller*
ATTORNEY

Nov. 23, 1965  J. R. COLE  3,219,971
METHOD AND APPARATUS FOR MAINTAINING PHASE RELATION
Filed Nov. 15, 1962  4 Sheets-Sheet 3
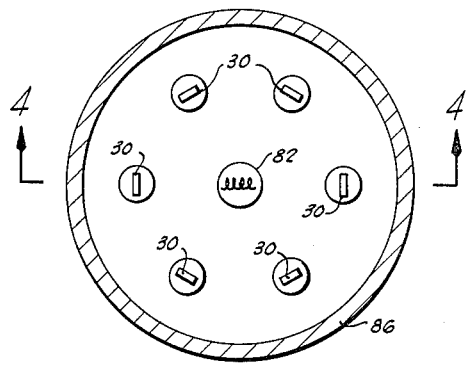
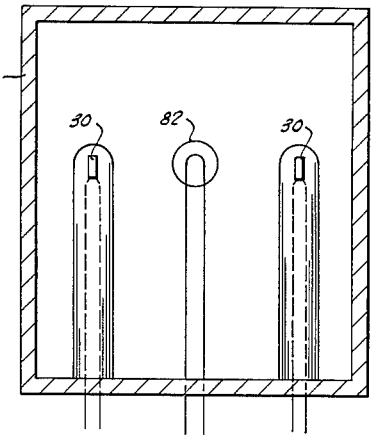
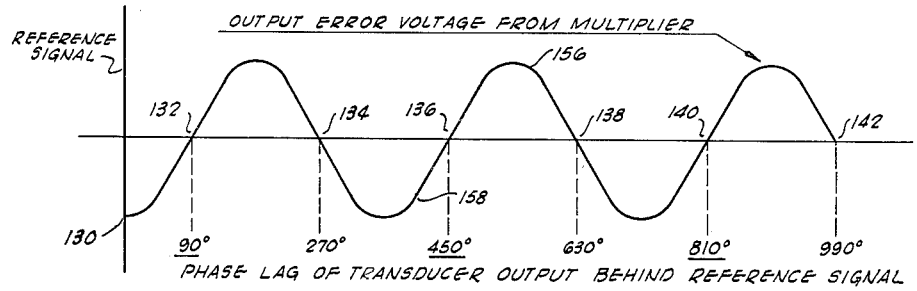
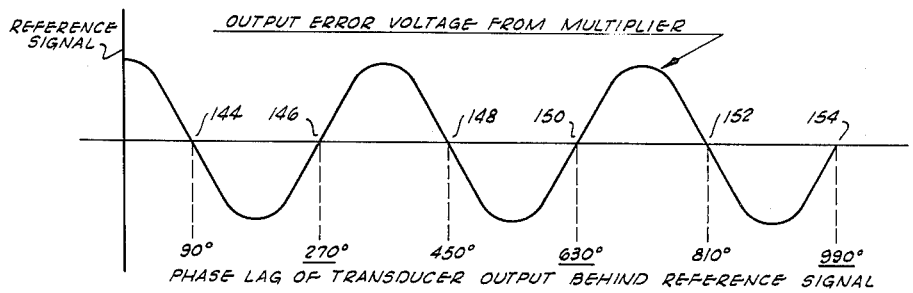
INVENTOR.
JIMMY R. COLE
ATTORNEY

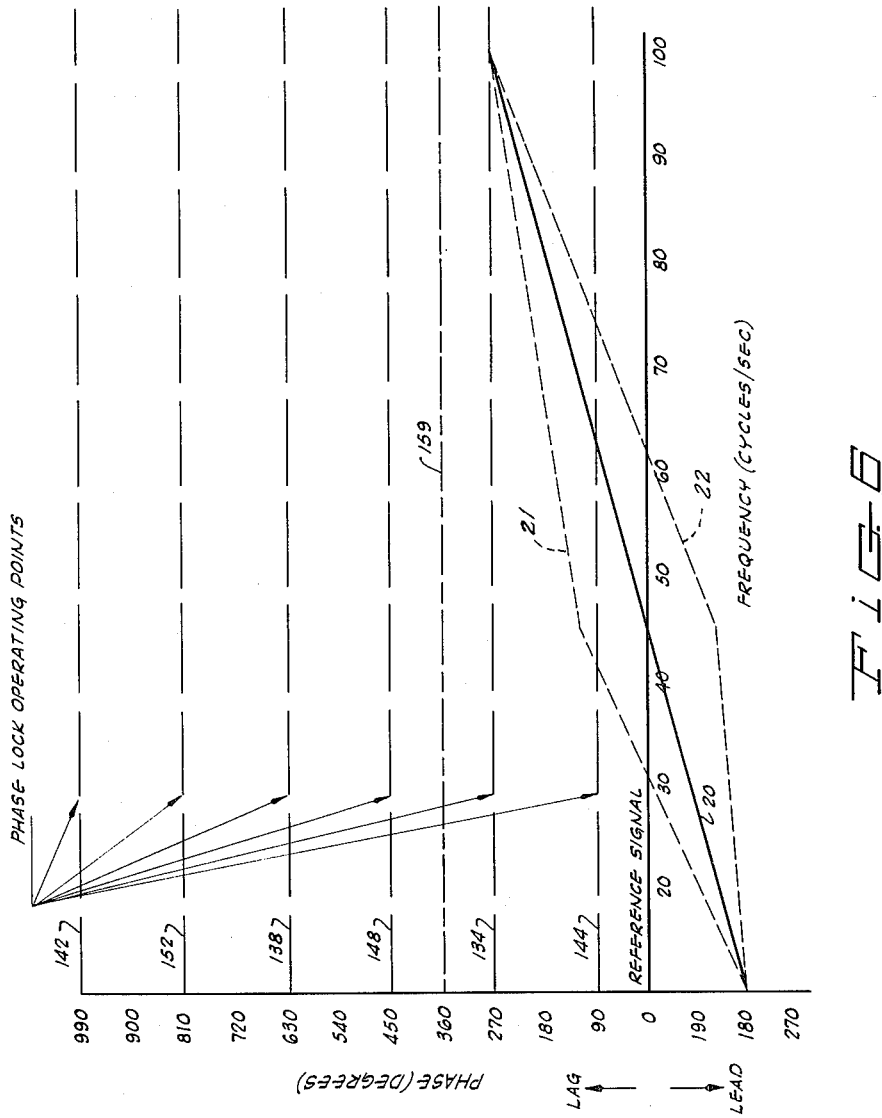

United States Patent Office 3,219,971
Patented Nov. 23, 1965

3,219,971
METHOD AND APPARATUS FOR MAINTAINING PHASE RELATION
Jimmy R. Cole, Ponca City, Okla., assignor to Continental Oil Company, Ponca City, Okla., a corporation of Delaware
Filed Nov. 15, 1962, Ser. No. 237,852
8 Claims. (Cl. 340—15.5)

The present invention relates to a method and an apparatus for maintaining a constant phase relationship between a reference signal and an output signal, and more particularly, but not by way of limitation, relates to such a method and apparatus for controlling a seismographic transducer in such a manner as to generate a seismic wave signal of controlled frequency content which is in a predetermined phase relationship with a reference signal.

There are many instances in which it is desirable to operate electronic, electromechanical, hydraulic or other similar devices at a controlled frequency and in synchronism with a reference signal or with another similar apparatus. One specific instance wherein the maintenance of a constant phase relationship is of utmost importance occurs when practicing the method of seismographic surveying described in its various aspects in U.S. Patents No. 2,688,124, No. 2,808,577, No. 2,981,928 and No. 2,989,726. Generally speaking, in this type of seismographic surveying, a seismic wave signal of controlled frequency content is generated at one surface point and the reflections of the seismic wave signals from the various subsurface strata are recorded at another surface point. The seismic wave signal is usually a pulse of several seconds duration and changes in frequency at a predetermined rate, usually either increasing or decreasing uniformly between 15–90 c.p.s., such that each wave pulse train is commonly referred to as either an up-sweep or a down-sweep. As the seismic wave sweep signal propagates downwardly, the entire sweep signal is reflected at each interface and will ultimately arrive at the second surface point where it is recorded. Since each of the reflections contains the full sweep signal, the various sweep signal reflections overlap with respect to time and produce a very complex wave form when recorded. However, by correlating a pure sweep signal, of the same frequency content, with the complex signal, random noise will to a large degree be cancelled out and the precise arrival time of each distinct sweep reflection can be determined with considerable accuracy. From this time data the various interfaces causing the reflections can be located with precision. However, it will be evident that if the seismic wave signal actually transmitted to the earth is appreciably out-of-phase with the reference signal, the correlation process cannot be accomplished. Therefore, it is highly critical that the seismic wave signal induced in the earth be maintained either in-phase with or at a fixed phase relationship to the reference signal.

The various types of seismic wave generators or seismic transducers may generally be classified as mechanical, electromagnetic, or hydraulic, but each type is controlled by a reference signal usually of pure sinusoidal wave form, which in turn controls the actuating mechanism for the seismic transducer. However, due to the inherent nature of mechanical devices, the transducers have a varying frequency response over the frequency spectrum of the reference signal so that when the pure sine wave of the reference signal is converted into a seismic signal, the seismic signal will not only be out-of-phase with the reference signal, but the degree of phase shift will vary over the frequency spectrum such that the seismic signal will be distorted. For example, the seismic signal generated by a typical transducer may lead the control reference signal by as much as 150° at 15 c.p.s. and lag the control reference signal by 250° at 95 c.p.s. Also, the phase relationship of the output seismic wave signal relative to the control reference signal is very much affected by the type of soil or ground upon which the transducer is positioned and operated, such that the phase relationship between the reference signal and seismic signal will vary appreciably from one locality to the next.

It is even more important to be able to control the phase relationship between the seismic wave signal induced in the earth by a transducer and a reference signal when a plurality of transducers are operated simultaneously in relatively close proximity in order to increase the intensity of seismic wave signals as taught in U.S. patent application Serial No. 837,108, entitled, "Method and Apparatus for Controlling a Seismic Vibrator," which was filed August 31, 1959, and is assigned to the assignee of the present invention. In this situation each of the vibrators will invariably have different natural phase responses to the common reference signal used to control all of the transducers, and further there will be random phase variations due to the nature of the soil to which each of the transducers is coupled. Accordingly, it is highly important that some means be provided for maintaining each of the seismic signals generated by the respective transducers in precise phase relation with respect to the common reference signal and therefore in precise synchronous phase relationship with each other, or the out-of-phase seismic signals will not only prevent correlation with the reference signal but will tend to interfere one with the other and cancel out. The application Serial No. 837,108 describes a method and apparatus for operating each of the vibrators in synchronism and in a fixed phase relationship to the reference signal. In general operation, this method and apparatus was adequate. However, if the seismic transducer produced severe distortion in its output seismic signal, the phase lock system of the previously used devices would sometimes fail because the system could not recognize the distortion. Further, the system used an electromechanical servo system for assisting in adjusting the phase and this mechanical system was not highly reliable. In its broader aspects the present invention provides an improved method and apparatus for maintaining a constant phase relationship between any two relatively steady state signals and in particular provides an improved method and apparatus for controlling the phase of the seismic wave output from a seismographic transducer.

Therefore, it is an important object of the present invention to provide a method and an apparatus for maintaining a constant phase relationship between a reference signal and an output signal from a device.

Another object of the present invention is to provide a method and an apparatus for synchronizing the operation of a seismographic transducer with a reference signal of a controlled and slowly changing frequency.

Another object of the present invention is to provide a method and an apparatus by which the fundamental frequency of the output signal being controlled can be distinguished from distortion and which will continuously maintain the desired phase relationship between the fundamental frequency and a reference signal.

Another object of the present invention is to provide a device of the type described which is entirely electronic and which is highly reliable.

Still another object of the present invention is to provide a totally electronic phase shifting device.

A still further object of the present invention is to provide a totally electronic phase shifting device which can be used to shift the phase of a signal 90 degrees or any multiple thereof.

A still further object of the present invention is to provide a linear phase shifting device for a steady state signal over a variable frequency range.

Many additional objects and advantages of the present invention will be evident from the following detailed description and drawings, wherein:

FIG. 1 is a schematic circuit diagram of a device constructed in accordance with the present invention which also serves to illustrate the method of the present invention;

FIG. 3 is a transverse sectional view, somewhat schematic, of a novel component of the apparatus of FIG. 1;

FIG. 4 is a sectional view taken substantially on lines 4—4 of FIG. 3;

FIG. 6 is a graph of phase shift plotted against frequency which serves to illustrate the operation of the devices of FIGS. 1 and 5;

FIG. 7 is a graph of the output error voltage from one of the components of the devices of FIGS. 1 and 5 plotted against the phase relationship between two input signals to the component; and, FIG. 8 is a graph similar to the graph of FIG. 7 but showing the output error voltage when one set of the leads to the component is reversed.

Figure 5:
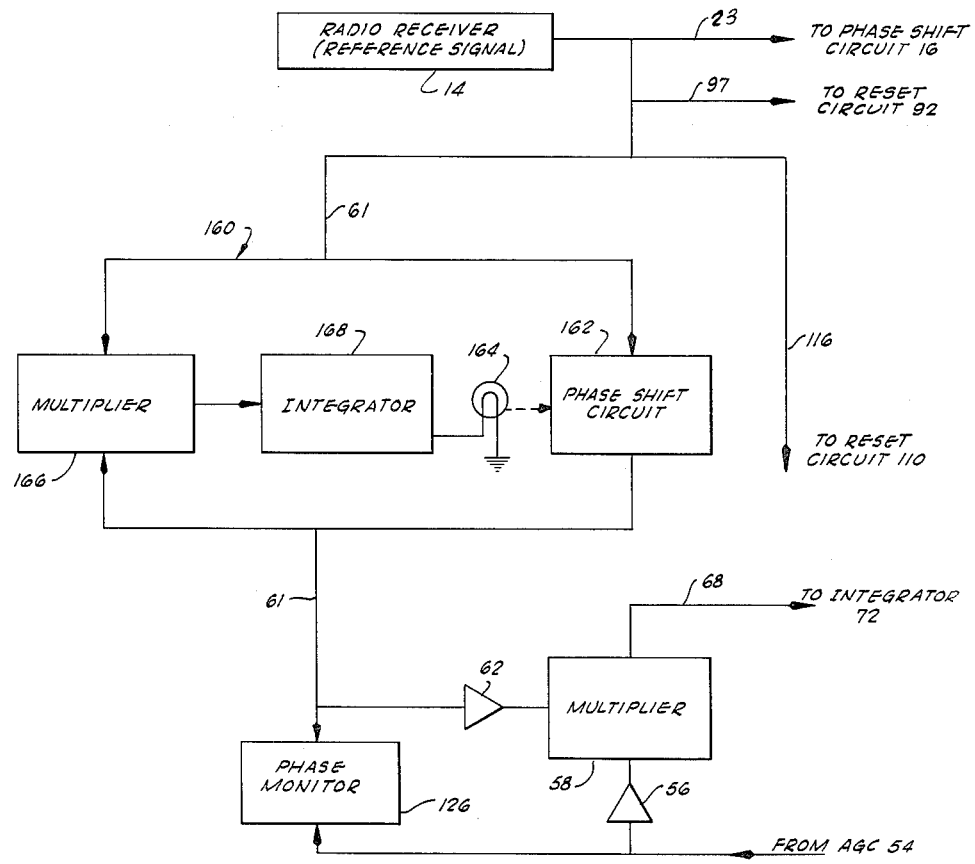
FIG. 5 is a schematic circuit diagram which, in combination with the circuit diagram of FIG. 1, shows another device constructed in accordance with the present invention.

In accordance with the method of the present invention, an output signal from a system including a phase shift network and, if desired, some other electronic, electromechanical, hydraulic, mechanical or other similar device, is maintained in constant phase relationship with respect to a reference signal put into the phase shift circuit by comparing the output signal with the reference signal and shifting the reference signal in such a manner as to provide the desired phase relationship. The output signal from the system is compared with the reference signal by multiplying the two signals to produce a product error signal which has zero value when the two signals are $\pi/2 + n\pi$ degrees out-of-phase, and has a maximum value when the two signals are $n\pi$ degrees out-of-phase, where $n$ is 0 or an integer. The product error signal is then integrated over a relatively long period of time to produce a phase shift signal which is applied to shift the reference signal applied to the system in such a manner as to establish the desired phase relationship between the output signal and the original, unshifted reference signal until the product error signal is reduced to zero and equilibrium of the system is established at the desired phase relationship.

When the output signal from the system and the original reference signal are multiplied, and the product error signal integrated to produce the phase shift signal, the phase shift signal will be dependent only upon the phase relationship between the fundamental frequency of the output signal and the fundamental frequency of the reference signal, and will not be affected by distortion in the output signal which frequently results from operation of the particular system used to produce the output signal. This can be shown mathematically by assuming that the reference signal has a fundamental frequency described by the function $$\text{Sin } \omega t \qquad (1)$$

and that the output signal from the system has both fundamental and second harmonic distortion and is represented by the function $$\text{Sin }(\omega t + \phi) + \text{Sin }(2\omega t + 2\phi) \qquad (2)$$

Then by multiplying (1) and (2), the product error signal is expressed by the function $$\text{Sin }\omega t[\text{Sin }(\omega t + \phi) + \text{Sin }(2\omega t + 2\phi)] \qquad (3)$$

which can be reduced to the function $$\tfrac{1}{2}\cos(-\phi) - \cos(2\omega t + \phi) + \cos(\omega t + 2\phi) - \cos(3\omega t + 2\phi) \qquad (4)$$

It will be noted from function (4) that only the first term is dependent upon phase. All other terms of (4) are A.C. terms and are reduced to negligible amplitude by integration of the product error signal to produce the phase shift signal.

As previously mentioned and as will be hereafter described in greater detail, the product error signal is zero so as to produce a stable phase shift signal and system stability only when the phase between the reference signal and the output signal is an odd multiple of 90 degrees. Accordingly when only one phase shift is employed the output signal can be made to lag the reference signal only by 90, 270, 450, etc., degrees.

However, in accordance with another important aspect of the present invention, the output signal can be made to lag the reference signal by any multiple of 90 degrees. This is accomplished by shifting the original reference signal by the method described above to produce a second reference signal which lags the original by an odd multiple of 90 degrees. Then the second reference signal is multiplied with the output feedback to produce a product error signal which signal is integrated to produce a phase shift signal. The phase shift signal then operates to shift the original reference signal such that the output feedback signal lags the second reference signal by some odd multiple of 90 degrees. Thus the total phase lag of the output signal behind the original reference signal will be equal to the sum of the phase lag of the second reference signal behind the original and the phase lag of the output signal behind the second reference signal. The sum of the two odd multiples of 90 degrees will produce an even multiple of 90 degrees such that the output signal can be made to lag the original reference signal by 180, 360, 540, etc., degrees, as desired.

The methods described above provide a means for maintaining a desired phase relationship between a relatively steady state reference signal and an output signal when the desired phase relationship is any whole number multiple of 90 degrees. Further, the phase relationship can easily be maintained over a wide frequency spectrum and provides a means for distinguishing between the fundamental frequency of the output signal and harmonic distortion caused by the system. Those skilled in the art will also recognize from the above and following description of the present invention that in the event the frequency of the reference signal is to be maintained constant so that a standard phase shift circuit capable of providing any degree of phase lag can be used, or if such a phase shift circuit having a linear response over the frequency range of the reference is available, then the second reference signal referred to above can be made to lag the original reference signal by any degree and accordingly make the output signal lag the reference signal by any degree. In this latter case, the method will continue to be able to select the fundamental frequency of the output signal to maintain any desired phase lag even though the output signal has appreciable distortion. Additional, more detailed aspects of the method of the present invention will best be understood from the following description of the apparatus constructed in accordance with the present invention.

Referring now to the drawings, and in particular to FIG. 1, an electronic device constructed in accordance with the present invention is indicated generally by the reference numeral 10. The device 10 is used to control a seismographic transducer, represented schematically and designated by the box 12, of the type utilized in the seismographic surveying methods described in the above referenced patents. The transducer 12 may be of any suitable type, electrical, mechanical or hydraulic, but in any case will normally be transported by a suitable truck. Assume that the transducer 12 is controlled by a reference signal transmitted by a radio from a remotely located recording van and received by a radio receiver 14, passed through the phase shift circuit 16 and applied to the transducer 12 as will hereafter be more fully described. The seismographic transducer 12 will then operate somewhat in synchronism with the received reference signal. Assume also that the frequency of the reference signal and therefore the seismic signal generated in the earth 18 by the transducer 12 is uniformly varied between 15 and 90 c.p.s., over a period of several seconds. The typical phase relationship between the seismic output signal from a typical tranducer and the phase of the reference signal can then be represented by the straight line 20 of the graph of FIG. 6. Further, the typical seismic transducer will operate, by reason of design, within the phase relationship region defined by the dotted lines 21 and 22. Thus it will be noted from FIG. 6 that as the frequency approaches zero the seismic output signal will lead the reference signal by approximately 180 degrees, and as the frequency approaches the upper limit of 100 c.p.s., the output signal may lag the reference signal as much as 270 degrees.

As previously mentioned, the frequencies of the reference signal, and therefore of the seismic output signal from the transducer 12, will normally change only a total of approximately 75 cycles over a period of several seconds. Accordingly, insofar as the phase relationship of the reference signal and seismic output signal is concerned, the system may be considered as steady state. Therefore, several cycles of phase lag can be lost between the reference signal and the seismic output signal and yet the two signals will appear to be "in-phase" so long as the phase lag is 360, 720 or 1080 degrees, or some whole number of cycles. Even if the seismic output signal lags the reference signal by a number of cycles plus some fractional part of a full cycle, the seismic output signal would appear to lag the reference signal by some angle less than 360 degrees. For example, if the output signal lags the reference signal by 810 degrees, the apparent lag would be only 90 degrees. Therefore, the output signal from the transducer 12 may be maintained at some fixed degree of lag with respect to the reference signal and for all practical purposes the output signal will then appear to be in-phase or at some fixed phase relationship to the reference signal less than 360 degrees.

The phase shift circuit 16 is comprised of a plurality of phase shift stages cascaded together to provide the total phase shift required. Each stage is comprised of a triode 24 having a grid 25, a cathode 26 and a plate 27. The cathode is connected through a resistor 28 to ground and the plate 27 is connected through a resistor 29 to a source of potential in the conventional manner. An output loop is comprised of a light dependent resistor 30, which is connected to the cathode 26, and a capacitor 33, which is connected to the plate 27. The light dependent resistor 30 is preferably a well known and commercially available semiconductor device the resistance of which is dependent upon the intensity of light striking the device. When not illuminated, the light dependent resistor has substantially infinite impedance. As the intensity of the light increases, the resistance of the light dependent resistor 30 decreases to substantially zero impedance. The reference signal input is applied to the grid 25 of the first stage and the output signal is taken from the output loop between the capacitor 33 and light dependent resistor 30 and is fed to the grid 25 of the next succeeding stage of the phase shift circuit. The operation of each stage and therefore of the phase shift circuit 16 will be evident to those skilled in the art. When the light dependent resistor 30 is not illuminated and has infinite impedance, the output point will be essentially connected by the capacitor 32 to the plate 27 such that the output will lag the input to the grid by approximately 180 degrees. When the light dependent resistor 30 is fully illuminated and its impedance reduced to zero, the output point will be essentially connected to the cathode 26 and the output signal will be in-phase with the input signal. When the light dependent resistor 30 is only partially illuminated and has an intermediate impedance value the degree of phase lag between the output and input signals will be proportional to the impedance of the device and therefore proportional to the intensity of the illuminating source which will hereafter be described. Each stage can then supply a theoretical phase shift of 180 degrees and an actual phase shift of approximately 170 degrees. Therefore in the embodiment of the present invention illustrated in FIG. 1, six phase shift stages are cascaded together by applying the output from stage #1 to the input grid of stage #2 and taking the output from stage #6 as the output from the phase shift circuit 16, such that a total phase shift of approximately 1,000 degrees is available. It will be noted that for convenience of illustration, only the first, second and sixth stages are shown in FIG. 1.

The output from the phase shift circuit is then fed through conductor 48 to the seismographic transducer 12 in such a manner as to induce a seismic output signal in the earth having a frequency content generally approximating the frequency content of the shifted reference signal leaving the phase shift circuit 16, but will differ in phase to varying degrees and to be distorted as described above. The seismic wave output signal from the transducer 12 is measured by an accelerometer 50 which may be conveniently connected to measure the acceleration of the plate of the transducer which is coupled to the earth 18 to obtain a seismic feedback signal closely approximating the seismic wave output signal. The seismic feedback signal from the accelerometer 50, which is a measure of the acceleration component of the seismic transducer 12, is then fed to an integrator 52 which converts the acceleration measurements into velocity measurements. This is preferred because in seismographic work earth particle velocity of the seismic waves is measured by the geophones at the recording van. The velocity seismic feedback signal is then fed from the integrator 52 to an automatic gain control network 54 which functions in the conventional manner to produce an output signal of constant magnitude which is fed through an amplifier 56 and suitable leads 57 to a multiplier 58.

Figure 2:
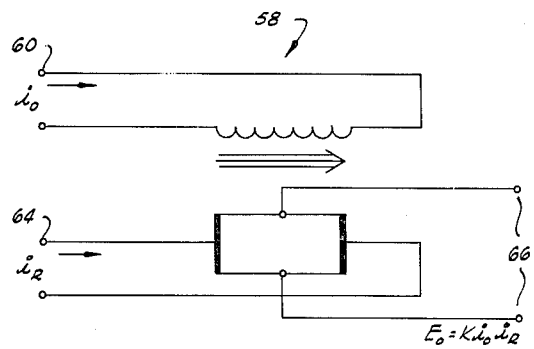
FIG. 2 is a schematic diagram of the multiplier component of the device of FIG. 1.

The multiplier 58 is preferably a conventional and commercially available Hall generator which is connected as illustrated schematically in FIG. 2. The seismic feedback signal from the amplifier 56 may be connected to the magnetic circuit terminals 60. The reference signal from the radio receiver 14 is fed through suitable conductor means 61 to an amplifier 62 and through suitable leads 63 to the input terminals 64 of the Hall multiplier 58. If the seismic feedback signal from the automatic gains control 54 and amplifier 56 is represented by $i_o$, and the reference signal is $i_r$, the output error signal from the terminals 66 of the multiplier 58 becomes $Ki_o i_r$. Therefore if $i_r$ is further defined by $\sin \omega t$ and $i_o$ by $\sin (\omega t + \phi)$ plus the various harmonic distortions resulting from operation of the transducer as described by functions (1) and (2) above, respectively, the error signal from the multiplier 58 will be as defined in function (4) such that the D.C. term $\frac{1}{2} \cos (-\phi)$ can be represented by the graph of FIG. 7 in terms of the degrees by which the seismic feedback signal lags the reference signal. As previously described, the A.C. terms of function (4) will be cancelled out by integration as will presently be described. Thus when the two signals are in-phase, the output error signal from the multiplier is a maximum negative voltage, as represented at 130, and when the seismic feedback signal lags the reference signal by 90 degrees, the output error signal from the multiplier is zero as at 132. Thus it will be noted that the output voltage from the multiplier is zero at points 134, 136, 138, 140 and 142 which occur at phase lag points of 270, 450, 630, 810 and 990 degrees.

FIG. 8 is a graph substantially identical to the graph of FIG. 7, except that FIG. 8 represents the error signal voltage when one of the three sets of leads 57, 63 or 68 to the multiplier 58 has been reversed such that the polarity of the corresponding signal will be reversed. Thus it will be noted that the output voltage from the multiplier 58 in this case is exactly reversed with respect to the output voltage of FIG. 7, although continuing to have zero values at the corresponding phase lag points of 90, 270, 450, 630, 810 and 990 degrees, as represented by the reference numerals 144, 146, 148, 150, 152, and 154. However, as will hereafter be described in greater detail, the device 10 reaches stability only when the error signal voltage from the multiplier 58 is zero at points 132, 136 and 140 of FIG. 7, which correspond to 90, 450 and 810 degrees, respectively, and points 146, 150 and 154 of FIG. 8, which correspond to 270, 630 and 990 degrees, respectively. The manner in which the particular stable operating point can be selected in order to maintain a constant phase relationship between the reference signal and the seismic feedback signal, and consequently the seismic wave output signal, will hereinafter be described. These points of zero error signal voltage and stable operating points will hereafter be designated as phase lock operating points and are represented in FIG. 6 by dotted lines designated by the corresponding reference numerals.

The output terminals 66 of the multiplier 58 are then connected by suitable conductor means 68 to an integrator circuit, indicated generally by the reference numeral 72. The integrator 72 comprises a standard Philbrick amplifier 74 in combination with a resistor 76 and a capacitor 78, each of which is connected as illustrated. The integrator should have a substantially infinite integral period so as to produce a continuous D.C. phase shift signal having a magnitude equal to the integral sum of all error signals received from the multiplier 58. The phase shift signal from the integrator 72 is fed through suitable conducting means 80 to an incandescent lamp 82 which is disposed in close proximity to the light dependent resistors 30 of the six separate stages of the phase shift circuit 16. As shown in FIG. 3, both the incandescent lamp 82 and the light dependent resistors 30 are preferable housed within a suitable light-tight compartment 86, and both should have a short time constant so as to provide a servo system having a rapid response. However, the combination of the incandescent lamp 82 and the light dependent resistors 30 provides a type of filter for further smoothing the output from the integrator 72 which, as previously mentioned, reduces all A.C. components of the error signal substantially to zero. Thus it will be seen that as the phase shift signal from the integrator increases to increase the brilliance of the lamp 82, the impedance of the light dependent resistors 30 will be decreased and the phase shift induced in the reference signal by the phase shift circuit 16 will be reduced.

A reset circuit, indicated generally by the reference numeral 92, is provided for automatically adjusting the magnitude of the phase shift signal from the integrator 72 to a desired level after each sweep signal generated by the transducer 12, in order to establish the desired phase lock operating point, as hereafter described in greater detail. The reset circuit 92 is comprised of a relay 94 having a coil 96 which is connected by suitable conductor means 97 to receive the reference signal from the radio receiver 14. The relay 94 has a switchblade 98 which is moved into engagement with an open contact 100 whenever the coil 96 is energized by the reference signal. When the coil 96 is de-energized, the switchblade 98 closes against a second contact 102 to complete a shunting circuit around the capacitor 78 and through the sliding contact of the rheostat 104. When the shunting circuit is completed, the capacitor 78 is no longer operative and the Philbrick amplifier 74 no longer functions as an integrator but merely as a D.C. amplifier. The rheostat 104 is connected between a source of potential 105 and ground such that a potential of the desired magnitude can be applied to the Philbrick amplifier 74 in such a manner as to produce a D.C. signal of constant magnitude for driving the incandescent lamp 82 to such a brilliance as will establish the necessary degree of phase lag in the reference signal, as will hereafter be described in greater detail.

A similar reset circuit is indicated generally by the reference numeral 110, for resetting the automatic gain control circuit 54 after each sweep signal to prevent saturation of the circuit at the beginning of the next sweep signal. The reset circuit 110 comprises a relay 112 having a coil 114 which is also energized by the reference signal from the radio receiver 14 through suitable conducting means 116. The relay 112 has a switchblade 118 which is closed against an open contact 120 whenever the coil 114 is energized by the reference signal. When the coil 114 is de-energized, the switchblade 118 closes against a second contact 122 to complete a circuit through the sliding contact of a rheostat 124. When the switchblade 118 is closed against the contact 122, the automatic gain control circuit 54 will automatically be reset at the proper level for the beginning of the next sweep signal. The rheostat 124 provides a means for adjusting the reset level.

A phase monitor 126, such as a conventional oscilloscope, may be connected in such a manner as to compare the phase of the output from the automatic gain control 54 with the phase of the reference signal and thereby provide a visual presentation of the relative or total phase between the seismic feedback signal from the transducer 12 and the reference signal to assist in establishing the proper operating point of the device and monitor its operation.

Referring now to FIG. 5, a phase shifting device indicated generally by the reference numeral 160 is inserted in the conductor means 61 between the radio receiver 14 and the amplifier 62 for shifting the reference signal before it is applied to the multiplier 58. The phase shifting device 160 comprises only those components of the phase shifting device 10 which are essential to provide a constant phase shift and accordingly serves to illustrate the broad utility of the present invention when applied to steady state operation. The phase shifting device 160 is comprised of a second phase shift circuit 162 which is substantially identical with the phase shift circuit 16, although it need include only two or three stages, and which is operated in the same manner by a second incandescent lamp 164. The phase shift circuit 162 receives the reference signal from the radio receiver 14, induces a phase lag to produce a second reference signal and feeds the second reference signal through the amplifier 62 to the multiplier 58. The output from the second phase shift circuit 162 is also connected by a feedback circuit to a second multiplier 166 where it is multiplied with the reference signal from the radio receiver 14. The second multiplier 166 is preferably identical to the multiplier 58 and produces an error signal as previously described in connection with the multiplier 58 which is fed to a second integrator 168. The second integrator 168 is identical to the integrator 72 and produces a D.C. phase shift signal which drives the second incandescent lamp 164 and thereby varies the phase lag induced by the phase shift circuit 162 in the reference signal from the radio receiver 14.

*Operation*

Assume now that a series of seismographic waves of controlled frequency content are to be induced in the earth 18. The transducer 12 is usually coupled to the earth by the weight of a truck used to transport both the transducer 12 and the device 10. A remotely located van usually transports the seismic wave signal pickup and the recording system together with a radio transmitter for broadcasting the reference signal to the radio receiver 14. Assume also that a series of seismic upsweep signals are to be generated in the earth which change uniformly from approximately 15 c.p.s. to 90 c.p.s. over a period of several seconds. In order to trace the basic operation of the device 10, also assume that the seismographic signal from the transducer 12 is to be made to always lag behind the reference signal received by the radio receiver by 450 degrees, such that the device will stabilize at phase lock operating point 148 of FIG. 8. Referring to FIG. 6, it will be noted that initially when the two signals have a frequency of 15 c.p.s. the output from the typical transducer 12 will lead the signal actually applied to the transducer by approximately 150 degrees. Therefore, if the total phase lag of the output seismographic signal is to be maintained 450 degrees behind the reference signal, the phase shift circuit 16 must produce a phase lag of 450 degrees plus 150 degrees, or a total phase lag of 600 degrees. Therefore, at the start of the upsweep the lamp 82 should illuminate the light dependent resistors of the several stages of the phase shift circuit to such a level as to produce 600 degrees of phase shift.

Then, upon receipt of the reference signal by the radio receiver 14, the reference signal will pass through the conductor means 23 and to the cascaded stages of the phase shift circuit 16, which will induce 600 degrees of lag. The lagging reference signal will then be applied to the transducer 12, which will operate 150 degrees in advance of the lagging reference signal such that the seismic output signal generated in the earth 18 will lag the original reference signal by 450 degrees. The frequency and phase of the velocity component of the seismic wave signal is duplicated by the accelerometer 50 and integrator 52 such that a seismic feedback signal from the transducer is fed through the automatic gain control 54 and amplifier 56 to the multiplier 58. At the same time, the reference signal from the radio receiver 14 is passed through the conductor means 61 and through the amplifier 62 to the multiplier 58. Assuming that the seismic feedback signal from the amplifier 56 is 450 degrees behind the reference signal from the radio receiver 14 and amplifier 62, it will be seen from FIG. 7 that the output error voltage signal from the multiplier will be zero. Since no error voltage is applied through the conducting means 68 to the integrator 72, the correction signal from the integrator 72 will remain at the same level and the brilliance of the incandescent lamp 82 will remain constant. Therefore, the impedance of each of the various light dependent resistors 30 of the several stages of the phase shift circuit 16 will remain constant and the reference signal will continue to be shifted 600 degrees before application to the transducer 12.

However, as the frequency of the reference signal increases, it will be noted from FIG. 6 that the phase lag of 600 degrees induced by the phase shift circuit 16 becomes excessive because at 30 c.p.s., for example, the phase lag required which must be induced is only 450 degrees plus 90 degrees, or a total of 540 degrees. Therefore, the seismic feedback signal passed through the amplifier 56 to the multiplier 58 will lag the reference signal applied to the multiplier through the amplifier 62 by more than the desired 450 degrees, and a positive output error voltage will be produced by the multiplier 58 as the phase lag between the two signals increases, as can be seen by reference to the portion 156 of the curve of FIG. 7. When the positive output error voltage is fed through the conductor means 68 to the integrator 72, the phase shift signal from the integrator 72 will increase due to integration of the error voltage and thereby increase the brilliance of the lamp 82. As the brilliance of the incandescent lamp 82 increases, the impedance of the light dependent resistors 30 of the phase shift circuit 16 decreases. This in turn produces a decrease in the phase shift of the reference signal which is fed to the transducer 12, which of course reduces the phase lag between the transducer seismic feedback signal and the reference signal until the output error voltage from the multiplier 58 is reduced to zero. When the output error voltage is reduced to zero, the phase shift signal from the integrator becomes stabilized. In the event the seismic feedback signal lags the reference signal by less than 450 degrees, the multiplier 58 will produce a negative output error voltage, as can be seen by the portion 158 of the curve of FIG. 7. When the negative error voltage is integrated into the phase shift signal from the integrator 72, the phase shift signal will be decreased, the brilliance of the incandescent lamp 82 decreased, and the impedance of each of the light dependent resistors 30 increased. The phase shift circuit 16 will then increase the phase lag induced in the reference signal which is fed to the transducer 12 to increase the phase lag between the transducer output signal and the reference signal back to 450 degrees. Thus it will be seen that whether the phase lag between the seismic feedback signal and the reference signal increases or decreases, a correction will be made in the brilliance of the lamp 82 in such a manner as to maintain the phase locked at 450 degrees.

As previously mentioned, the output error voltage from the multiplier 58 becomes zero every 180 degrees of lag, beginning at 90 degrees, as will be evident from FIGS. 7 and 8. However, assuming that the seismic feedback signal lags the reference signal by 270 degrees, from FIG. 7 it will be noted that as the lag increases, as would be the case during an upsweep, the output error voltage from the multiplier 58 becomes negative. The negative output error voltage fed to the integrator 72 will reduce the level of the phase shift signal and the brilliance of the incandescent lamp 82 which increases the resistance of the light dependent resistors of the phase shift circuit 16, which in turn increases the total phase lag. Therefore, the phase lag will continue to increase until 450 degrees of lag exist which as previously explained is a stable phase lock operating point. Similarly, if the phase lag of the seismic feedback signal with respect to the reference signal decreases from 270°, by reference to FIG. 7 it will be noted that the output error voltage from the multiplier 58 becomes positive. The positive error voltage causes the phase shift signal from the integrator 72 to increase, thereby increasing the brilliance of the incandescent lamp 82 and decreasing the resistance of the light dependent resistors of the phase shift circuit 16. This will decrease the phase lag induced by the phase shift circuit 16 until the phase difference between the two signals fed to the multiplier is only 90 degrees. Thus it will be noted that when the polarities of the two signals applied to the multiplier and the output from the multiplier are such as to produce an output error voltage as represented by the curve of FIG. 7, the zero operating point of 270 degrees lag is instable. Therefore it will be noted that stable, phase lock operating points occur only when the output error voltage curve of FIG. 7 proceeds through zero from negative to positive as is the case at 90, 450 and 810 degrees. Conversely, when the output error curve passes from positive to negative, the zero value points are instable, as at 270, 630 and 990 degrees on the curve of FIG. 7. However, if any one of the three leads 57, 63 or 68 to the multiplier 58 is reversed, so that the polarity of the seismic feedback signal, the reference signal or the output error voltage signal is reversed, so as to produce an output error voltage from the multiplier as represented by the curve of FIG. 8, it will be evident that the zero error voltage points of 90, 450 and 810 degrees become instable, and the zero points at 270, 630 and 990 degrees become stable or phase lock operating points.

From the above discussion, it will be evident that the particular phase lock operating point, i.e., the phase lag which is constantly maintained between the seismic feedback signal and the reference signal, is dependent upon the brilliance of the incandescent lamp 82 at the beginning of operation, which in the instant application would be at the beginning of the upsweep reference signal. Therefore the phase lock operating point can readily be selected merely by setting the phase shift signal from the integrator 72 at such a level as to cause the phase shift circuit 16 to initially induce a phase lag within the following limits. For example, when the signal polarities to the multiplier 58 are such as to produce the output error voltage curve of FIG. 7, the initial phase lag induced by the phase shift circuit 16 need only be somewhere between 420 degrees and 780 degrees in order to establish a phase lock operating point of 450 degrees for an upsweep seismic signal beginning at 15 c.p.s. By referring to FIG. 6, it will be noted that this phase lag in the reference signal will produce a phase lag between the seismic feedback signal and the reference signal between 270 degrees and 630 degrees. If the initial phase lag of the transducer output signal is within these limits, output error voltages will be produced by the multiplier 58 which will drive the phase shift circuit in such a manner as to automatically lock in at 450 degrees, as will be evident from FIG. 7.

It will be noted that a phase lag of only 90 degrees between the seismic feedback signal and the reference signal is insufficient to produce the desired results because, as will be evident by reference to the curve 20 of FIG. 6, at 90 c.p.s. the transducer 12 will cause almost 270 degrees of lag. Therefore when the polarities are such as shown in FIG. 7, the device 10 can only operate at phase lock operating points of 450 and 810 degrees. However, if the polarity of any one of the three signals associated with the multiplier 58 is reversed so as to produce the output error voltage curve of FIG. 8, the device 10 can be made to operate at the phase lock operating points of 270, 630 or 990 degrees. Thus it will be evident that substantially any desired total phase difference between a reference signal and the seismic output signal can be attained by the device 10 at, of course, the 180 degree intervals of the phase lock operating points of FIG. 6. In the event a downsweep reference signal is used, the device 10 will operate in the same manner except that the initial phase lag produced by the phase shift circuit 16 will be smaller and the amount of phase shift can be expected to increase as the frequency of the reference signal decreases, as will be evident from FIG. 6.

Assume once again that the transducer 12 is to be utilized to generate a series of upsweep seismic wave signals, that the transducer 12 has an operating frequency response as represented by the line 20 of FIG. 6, and that the device 10 is to be operated at the 450 degrees phase lock operating point. Then at the beginning of each upsweep reference signal, the phase shift circuit will be called upon to produce a phase lag of 450 plus 150 degrees, as described above. However, at the end of each upsweep, the phase shift circuit 16 need only induce a phase lag of approximately 200 degrees at 90 c.p.s., as can be seen from FIG. 6. Therefore, it will be noted that the phase shift circuit 16 must be reset to induce a phase lag of 450±180 degrees in order to maintain the phase lock operating point of 450 degrees for each successive sweep signal. The reset circuit 92 is provided for this purpose. During the occurrence of the reference signal, the reference signal energizes the coils 96 of the relay 94 and moves the switchblade 98 against the open contact 100. The integrator 72 then functions in the manner previously described. However, at the end of each upsweep, the reference signal ceases and the switchblade 98 drops against the contact 102 to complete the circuit through the sliding contact of the rheostat 104 and also shunt the capacitor 78. With the capacitor 78 shunted, the Philbrick amplifier 74 no longer functions as an integrator but as a conventional amplifier, and a desired operating potential may be applied through the rheostat 104 to control the output from the Philbrick amplifier 74 and thereby control the brilliance of the incandescent lamp 82. Therefore, merely by adjusting the rheostat 104, the initial phase shift induced in the reference signal can be controlled and accordingly the phase lock operating point of the device 10 selected. Further, by closely approximating the 600 degrees phase lag required at the start of the upsweep reference signal, the time required for the device 10 to acquire the desired phase lock is greatly reduced.

The automatic gain control circuit 54 is provided because as the frequency increases, a corresponding increase in magnitude of the seismic feedback signal is produced because of increased acceleration. The purpose of the automatic gain control is to maintain the amplitude of the feedback signal applied to the multiplier fairly constant regardless of the amplitude of the signal generated by the accelerometer and integrator circuits so as to prevent oscillation of the system. The automatic gain control then permits the feedback gain to be adjusted for maximum stability. However, at the end of each reference signal sweep, the automatic gain control circuit 54 will go to a maximum value because no signal at all will be present. If left in this condition, at the beginning of the next reference signal sweep the automatic gain control will be saturated. Therefore, it is essential that the automatic gain control be reset after each reference signal sweep to a gain value closely approximating that which will be required at the beginning of the next reference signal sweep. This function is provided by the reset circuit 110 in much the same manner as the integrator reset circuit 92 described above. When the reference signal is present in the coil 114, the switchblade 118 is moved upwardly into engagement with the open contact 120. In this position the automatic gain control 54 functions in a normal manner. However, when the reference signal stops and the coil 114 is de-energized, the switchblade 118 falls into engagement with the contact 122 to complete a circuit through the sliding contact of the rheostat 124 to the automatic gain control 54. The rheostat 124 can then be used to adjust the level of the output of the automatic gain control preparatory to the start of the next upsweep reference signal, at which time the coil 114 will again be energized and move the switchblade 118 against the contact 120 such that the automatic gain control 54 will function in a normal manner beginning at the desired gain level.

From the above detailed description, it will be evident that a novel method and device for maintaining a constant phase relationship between a reference signal and an output signal from a device has been disclosed. The method and device provide a means for discriminating between the primary frequency and any harmonic distortions in the output signal, so that phase lock can be attained between the primary frequency and the reference signal even in the presence of distortions. Further, a novel device has been described for maintaining a fixed phase relationship between a reference signal and an output signal in accordance with the novel method, which has no mechanical components and which is therefore highly reliable. Also, a device has been described for controlling the operation of a seismic transducer in such a manner as to permit the transducer to generate a series of seismographic wave sweep signals having controlled frequency content varying between upper and lower limits as described above. The seismic sweep signals are maintained in a fixed phase relationship to a reference signal which may be sent from a remotely located recording van. Further, the synchronization of the transducer to the reference signal provides a means whereby a plurality of transducers may be operated simultaneously and in synchronism so as to increase the magnitude of the seismic wave signals generated in the earth.

However, it will be noted from FIG. 6 that the phase lock operating points lag the reference signal by $90+n\pi$ degrees where $n$ is a positive integer. Therefore, upon comparing the output signal from the transducer 12 with the reference signal in some manner, such as by an oscilloscope, the output signal will appear to lag the reference signal by either 90 or 270 degrees. Accordingly, before the seismic wave signal may be correlated with the reference sweep signal in accordance with the methods described in the above reference patents, it is essential that the 90 degree phase difference be eliminated. This can be accomplished by a suitable phase shifting network disposed either in the recording system used for recording the seismographic wave reflections or in the recording playback and correlation systems. Or the output signal from the transducer 12 may be made to appear in-phase with the reference signal by shifting either the reference signal or the seismic feedback signal 90 degrees before entering the multiplier 58. The phase shift device 160 of FIG. 5 may be used for providing the additional 90 degrees of phase shift required to make the two signals appear to be in-phase and also serves to demonstrate the broader aspects of the present invention.

Since the three components of the phase shifting device 160 are identical to the multiplier 58, integrator 72 and phase shift circuit 16 of the device 10, the phase shift device 160 will operate in substantially the same manner, and accordingly the graphs of FIGS. 6, 7 and 8 will be referred to in order to explain the operation of the device 160. In this analogy, the reference signal is the same for both devices and is fed into the phase shift circuit 162. The output from the phase shift circuit 162 corresponds to the seismic wave output signal and will hereafter be referred to as the second reference signal because it is applied to the multiplier, as will presently be described. The second reference signal is also fed back to the multiplier 166 and therefore corresponds to the seismic feedback signal. Therefore from the previous discussion of the operation of the device 10, it will be appreciated that the second reference signal can be made to lag the original reference signal by $\pi/2+n\pi$ where $n$ is a positive integer. Of course it will be appreciated that in order to obtain all of these values of phase lag it is necessary to reverse the polarity of one of the signals associated with the multiplier 166 part of the time so as to produce output error voltages from the multiplier 166 corresponding to both FIG. 7 and FIG. 8.

Referring now to the combined circuitries of FIGS. 1 and 5, it will be noted that the total phase lag between the transducer output signal and the reference signal of the radio receiver 14 will be equal to the sum of the phase lag resulting from the particular phase lock operating point of the multiplier 58 and the particular phase lock operating point of the multiplier 166. Therefore, if the multiplier 166 is so connected that the polarities of the various signals produce an output error voltage to the integrator 168, as shown in FIG. 7, the second reference signal from the phase shift device 160 which is applied to the multiplier 58 may be made to lag the reference signal from the radio receiver 14 by 90 degrees or 450 degrees. Then if the multiplier 58 is connected in such a manner as to produce an output error voltage to the integrator 72 as described by the voltage curve of FIG. 8, the seismic feedback signal can be made to lag the second reference signal by 270 degrees, 630 degrees or 990 degrees. In either case, the total phase lag between the seismic wave output signal from the transducer and the original reference signal of the radio receiver 14 will be a multiple of 360 degrees. More specifically, if the phase shift device 160 is operated to produce the output error voltage of FIG. 7 and a 90 degree phase lag between the second reference signal and the original reference signal from the radio receiver 14, and the multiplier 58 is operated to produce the output error voltage of FIG. 8 and a 270 degree phase lag between the seismic feedback signal and the second reference signal, the total phase lag of the seismic feedback signal and therefore the seismic wave output signal behind the original reference signal of the radio receiver 14 will be 360 degrees which, as indicated by the dotted line 159 of FIG. 6, is sufficient to compensate for any phase lag which might be caused by the transducer 12, as represented by the line 20. When the seismic wave output signal from the transducer lags the reference signal by 360 degrees, it is impossible to detect the phase lag and accordingly the output would appear to be in-phase with the reference signal.

It will also be evident that the multiplier 166 could be connected in such a manner as to produce an output error voltage corresponding to the curve of FIG. 8, and the multiplier 58 could be connected in such a manner as to produce an output error voltage corresponding to the curve of FIG. 7, in which case the second reference signal would lag the original reference signal by 270 degrees, and the seismic feedback signal would lag the second reference signal by 90 or 450 degrees. In any event, the total phase lag will be an even multiple of 360 degrees so that no phase difference will be detectable between the original reference signal at the radio receiver 14 and the seismic feedback signal from the transducer 12. Therefore, it will be evident that by combining two of the basic phase shifting devices constructed in accordance with the present invention, a total phase shift having any multiple of 90 degrees may readily be established, and maintained with precision.

Having thus described several preferred embodiments of the present invention, it is to be understood that various changes, alterations and substitutions can be made therein without departing from the spirit and scope of the present invention as defined by the appended claims.

What is claimed is:

1. Apparatus for maintaining a constant phase relationship between a series of seismic wave output signals generated in the earth by a seismic transducer in response to a series of reference sweep signals, the apparatus comprising:

means for generating the series of reference sweep signals;

phase shift circuit means operatively connected to the means for generating the series of reference sweep signals and to the seismic transducer for inducing a phase lag in the reference sweep signals proportional to the magnitude of a phase shift signal applied to the phase shift circuit means and applying the reference sweep signals to the seismic transducer to produce the seismic wave output signals;

feedback circuit means for producing an output feedback signal in a predetermined, constant phase relationship with the seismic output signal;

multiplier means operatively connected to the feedback circuit means and to the means for generating the series of reference sweep signals for multiplying the reference signal and the output feedback signal to produce an error signal when the two signals are other than 90 degrees out-of-phase;

integrator means operatively connected to the multiplier means and to the phase shift circuit means for integrating the error signal over a time period and producing a phase shift signal equal to the integral sum of the error signal plus a predetermined value and applying the phase shift signal to the phase shift circuit means for inducing a phase lag in the reference sweep signal; and, integrator reset circuit means operatively connected to the means for generating the series of reference sweep signals and to the integrator means for resetting the phase shift signal from the integrator means at the predetermined value preparatory to each reference sweep signal, whereby the output feedback signal will constantly lag the reference sweep signal by $\pi/2+n\pi$ degrees where $n$ is an integer depending upon the predetermined value of the phase shift signal.

2. Apparatus for maintaining a constant phase relationship between a series of seismic wave output signals generated in the earth by a seismic transducer in response to a series of reference sweep signals as defined in claim 1, further characterized by:

second phase shift circuit means operatively connected between the multiplier means and the means for generating the series of reference sweep signals, the second phase shift circuit means inducing a predetermined phase lag in the reference sweep signal to produce second reference sweep signals which are applied to the multiplier means and multiplied with the output feedback signal to produce an error signal when the second reference sweep signals and the output feedback signals are other than 90 degrees out-of-phase, whereby the output feedback signals can be maintained in any predetermined phase relationship to the reference sweep signals.

3. Apparatus for maintaining a constant phase relationship between a series of seismic wave output signals generated in the earth by a seismic transducer in response to a series of reference sweep signals as defined in claim 1, further characterized by:

second phase shift circuit means operatively connected to the means for generating the series of reference sweep signals and to the multiplier means for inducing a phase lag in the reference sweep signals proportional to a phase shift signal to produce second reference sweep signals which are applied to the multiplier means;

second multiplier means operatively connected to the means for generating the series of reference sweep signals and to the second phase shift circuit means for multiplying the reference sweep signals and the second reference sweep signals to produce an error signal when the two sweep signals are other than 90 degrees out-of-phase;

second integrator means operatively connected to the second multiplier means and to the second phase shift circuit means for integrating the error signal over a time period and producing a second phase shift signal which is applied to the second phase shift means to induce a phase lag in the reference sweep signals such that the second reference sweep signals will constantly lag the reference sweep signals by $\pi/2 + n\pi$ degrees where $n$ is an integer, whereby upon multiplication of the second reference sweep signals by the output feedback signals the output feedback signals will constantly lag the reference sweep signals by $n\pi$ degrees where $n$ is an integer.

4. Apparatus for maintaining a constant phase relationship between a series of seismic wave output signals generated in the earth by a seismic transducer in response to a series of reference sweep signals as defined in claim 1 wherein:

the phase shift circuit means is comprised of a plurality of phase shift stages each having an input and an output, the stages being cascaded together such that the output from one stage is operatively connected to the input of the next succeeding stage, each stage having a light dependent resistor for controlling the degree of phase lag induced by the stage, the degree of phase lag induced being proportional to the impedance of the light dependent resistor of the stage, and the impedance of the light dependent resistor being proportional to the brilliance of light striking the resistor; and, a light source operatively connected to the integrator means and disposed adjacent each of the light dependent resistors for illuminating the resistors, the brilliance of the light source being proportional to the magnitude of the phase shift signal from the integrator means, whereby the impedance of each of the light dependent resistors and therefore the total phase lag of the phase shift circuit means are proportional to the magnitude of the phase shift signal.

5. Apparatus for maintaining a constant phase relationship between a series of seismic wave output signals generated in the earth by a seismic transducer in response to a series of reference sweep signals as defined in claim 1 wherein:

the multiplier means comprises a Hall generator connected as a multiplier.

6. Apparatus for maintaining a constant phase relationship between a series of seismic wave output signals generated in the earth by a seismic transducer in response to a series of reference sweep signals as defined in claim 1 wherein the feedback circuit means includes:

an automatic gain control for maintaining the output feedback signal at a constant amplitude; and, second reset circuit means for establishing a predetermined gain level preparatory to each output feedback signal such that the automatic gain control will not be saturated at the start of each sweep signal.

7. An apparatus for shifting the phase of a reference signal to produce an output signal having a constant, predetermined phase relationship to the reference signal, the apparatus comprising:

means for producing a reference signal;

phase shift circuit means operatively connected to the means for producing the reference signal for inducing a phase lag in the reference signal proportional to the magnitude of a phase shift signal applied to the phase shift circuit means to produce an output signal;

phase comparator means operatively connected to the means for producing a reference signal and to the phase shift circuit means for comparing the phase of the output signal with respect to the phase of the reference signal and producing an error signal when the two signals are out of a predetermined phase relationship;

integration means operatively connected to the phase comparator means and to the phase shift circuit means for integrating the error signal to produce a phase shift signal, and applying the phase shift signal to the phase shift circuit means to induce a phase lag in the reference signal proportional to the phase shift signal and produce the output signal, whereby the output signal from the phase shift circuit means will be shifted until the predetermined phase relationship between the output signal and the reference signal is established and the error signal is zero, wherein said phase shift circuit means comprises:

a plurality of phase shift stages each having an input and an output, the stages being cascaded together such that the output from one stage is operatively connected to the input of the next succeeding stage, each stage having a light dependent resistor for controlling the degree of phase lag induced by the stage, the degree of phase lag induced being proportional to the impedance of the light dependent resistor of the stage, and the impedance of the light dependent resistor being proportional to the brilliance of light striking the resistor; and, a light source operatively connected to the integrator means and disposed adjacent each of the light dependent resistors for illuminating the resistors, the brilliance of the light source being proportional to the magnitude of the phase shift signal from the integrator means, whereby the impedance of each of the light dependent resistors and therefore the total phase lag of the phase shift circuit means are proportional to the magnitude of the phase shift signal.

8. An apparatus for maintaining a constant phase relationship between an output signal from a device and a reference signal, the apparatus comprising:

means for producing a reference signal;

phase shift circuit means operatively connected to the means for producing a reference signal and to the device for inducing a phase lag in the reference signal and then applying the reference signal to the device for producing the output signal, the degree of phase lag induced by the circuit means being proportional to a phase shift signal applied to the circuit means;

feedback circuit means operatively connected to the device for producing a feedback signal in a constant, predetermined phase relationship to the output signal from the device;

multiplier means operatively connected to the means for producing the reference signal and to the feedback circuit means for multiplying the reference signal and the feedback signal to produce an error signal when the two signals are out of a predetermined phase relationship;

integrator means operatively connected to the multiplier means and to the phase shift circuit means for integrating the error signal to produce a phase shift signal the magnitude of which equals the integral sum of the error signal over a period of time and for applying the phase shift signal to the phase shift circuit means to induce a phase lag in the reference signal proportional to the magnitude of the phase shift signal, whereby the phase of the output signal from the device will be shifted until the reference signal and the feedback signal are in the predetermined phase relationship and the multiplier produces a zero error signal, wherein said phase shift circuit means comprises:

a plurality of phase shift stages each having an input and an output, the stages being cascaded together such that the output from one stage is operatively connected to the input of the next succeeding stage, each stage having a light dependent resistor for controlling the degree of phase lag induced by the stage, the degree of phase lag induced being proportional to the impedance of the light dependent resistor of the stage, and the impedance of the light dependent resistor being proportional to the brilliance of light striking the resistor; and, a light source operatively connected to the integrator means and disposed adjacent each of the light dependent resistors for illuminating the resistors, the brilliance of the light source being proportional to the magnitude of the phase shift signal from the integrator means, whereby the impedance of each of the light dependent resistors and therefore the total phase lag of the phase shift circuit means are proportional to the magnitude of the phase shift signal.

References Cited by the Examiner

UNITED STATES PATENTS

| | | | |
|---|---|---|---|
| 2,261,083 | 10/1941 | Harrison | 323—101 |
| 2,564,682 | 8/1951 | Fisk et al. | 323—101 |
| 2,906,956 | 9/1959 | Masonson | 323—101 |
| 3,003,096 | 10/1961 | Du Bois | 307—88.5 |
| 3,058,052 | 10/1962 | Keene | 323—101 |
| 3,119,964 | 1/1964 | Crafts | 328—155 |
| 3,147,459 | 9/1964 | McCarter | 340—15.5 |

SAMUEL FEINBERG, *Primary Examiner.*

CHESTER L. JUSTUS, *Examiner.*